United States Patent
Dede et al.

(10) Patent No.: US 12,372,718 B2
(45) Date of Patent: Jul. 29, 2025

(54) DUAL RING RESONATOR SYSTEMS WITH THERMAL ISOLATION, OPTICAL PERFORMANCE, AND REDUCED TRANSMISSION LOSS AND METHODS THEREOF

(71) Applicants: Toyota Motor Engineering & Manufacturing North America, Inc., Plano, TX (US); The Board of Trustees of the Leland Stanford Junior University, Stanford, CA (US)

(72) Inventors: Ercan M. Dede, Ann Arbor, MI (US); Sean P. Rodrigues, Ann Arbor, MI (US); Jiahui Wang, Redwood City, CA (US); Shanhui Fan, Stanford, CA (US)

(73) Assignee: Toyota Motor Engineering & Manufacturing North America, Inc., Plano, TX (US)

( * ) Notice: Subject to any disclaimer, the term of this patent is extended or adjusted under 35 U.S.C. 154(b) by 157 days.

(21) Appl. No.: 18/309,097

(22) Filed: Apr. 28, 2023

(65) Prior Publication Data

US 2024/0361522 A1    Oct. 31, 2024

(51) Int. Cl.
  *G02B 6/293*   (2006.01)
  *G02B 6/12*    (2006.01)

(52) U.S. Cl.
  CPC ..... *G02B 6/12007* (2013.01); *G02B 6/29343* (2013.01); *G02B 6/29395* (2013.01)

(58) Field of Classification Search
  None
  See application file for complete search history.

(56) References Cited

U.S. PATENT DOCUMENTS

| | | | |
|---|---|---|---|
| 2013/0037692 A1* | 2/2013 | Akiyama | G02F 1/0147 250/201.1 |
| 2020/0280173 A1 | 9/2020 | Gao et al. | |
| 2020/0393707 A1 | 12/2020 | Zhang et al. | |
| 2021/0109382 A1 | 4/2021 | Bovington | |
| 2022/0066093 A1* | 3/2022 | Kimura | G02B 6/02204 |

FOREIGN PATENT DOCUMENTS

| | | |
|---|---|---|
| CN | 113485033 A | 10/2021 |
| GB | 2587071 A | 3/2021 |
| WO | 2021257557 A1 | 12/2021 |

OTHER PUBLICATIONS

Resolving the thermal challenges for silicon microring resonator devices (https://www.degruyter.com/document/doi/10.1515/nanoph-2013-0013/html?lang=en), Sep. 11, 2013.

* cited by examiner

*Primary Examiner* — Chad H Smith
(74) *Attorney, Agent, or Firm* — Dinsmore & Shohl LLP

(57) ABSTRACT

A dual ring resonator including a base substrate, and a silicon oxide layer positioned on the base substrate having a first waveguide, a primary ring resonator optically coupled to the first waveguide, a second waveguide, and a secondary ring resonator optically coupled to the primary ring resonator and the second waveguide. The dual ring resonator further includes at least one heater disposed partially on the primary ring resonator, and a trench within at least the silicon oxide layer and surrounding at least a portion of the first waveguide and the second waveguide.

18 Claims, 11 Drawing Sheets

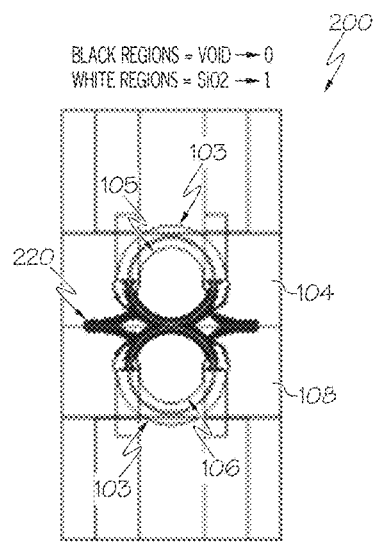 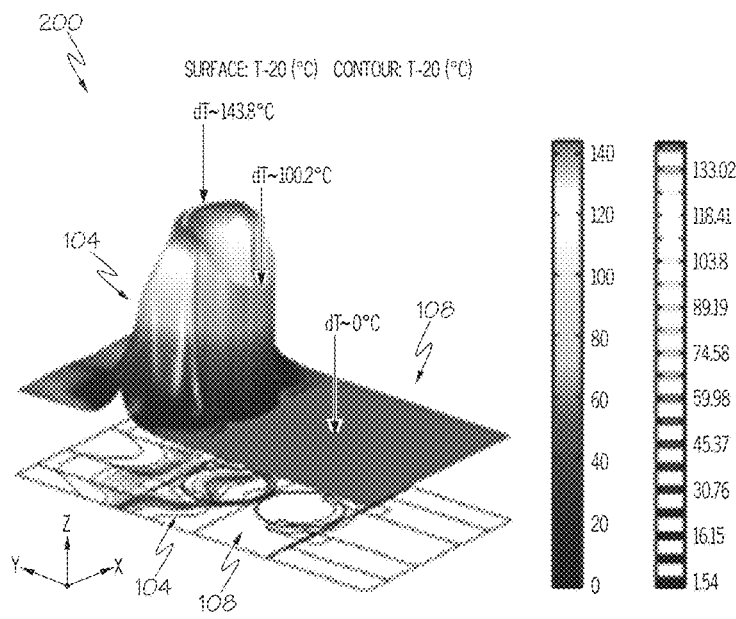
FIG. 5A
FIG. 5B

ETCH PATTERN 1 um DEPTH 2 um DEPTH 4 um DEPTH

DUAL RING RESONATOR SYSTEMS WITH THERMAL ISOLATION, OPTICAL PERFORMANCE, AND REDUCED TRANSMISSION LOSS AND METHODS THEREOF

TECHNICAL FIELD

The present disclosure generally relates to optical device systems and, more specifically, dual ring resonator systems for thermal isolation, optical performance, and reduced transmission loss having ring resonators, as well as methods for thermal isolation and reduced transmission loss.

BACKGROUND

Silicon photonics is the study and application of photonic systems, which use silicon as an optical medium. Silicon photonics devices, such as filters, often employ coupled-resonator structures in the form of micro cavities in photonic crystals or ring resonators in photonic circuits. In many cases, thermal isolation of individual cavities or rings may facilitate thermal tuning of the performance of such circuits.

Effective thermal isolation confines heat to a particular region of the silicon photonics circuit to better exploit the thermal dependence of a particular cavity or ring on the local refractive index of the base silicon material when subjected to an external thermal load (e.g., from a laser or overclad heater) for response tuning.

Optical ring resonators may be utilized in a standalone fashion or combined to form optical modulators, switches, biosensors, or filters. In filter applications, multiple ring resonators may be arranged in parallel or series configuration depending on the end use and layout. In a parallel configuration, dual ring resonators may form a complex filter, where the reflectivity of the device may be tuned to control reflection versus transmission. Over the range of applications and for optical filters in particular, precise control of the electromagnetic response of, and interaction between, ring resonators is beneficial to performance.

SUMMARY

An embodiment of the present disclosure takes the form of a dual ring resonator including a base substrate, and a silicon oxide layer positioned on the base substrate having a first waveguide, a primary ring resonator optically coupled to the first waveguide, a second waveguide, and a secondary ring resonator optically coupled to the primary ring resonator and the second waveguide. The dual ring resonator further includes at least one heater disposed partially on the primary ring resonator, and a trench within at least the silicon oxide layer and surrounding at least a portion of the first waveguide and the second waveguide.

A further embodiment takes the form of a photonics integrated circuit including a base substrate, and a dual ring resonator positioned on the base substrate having a silicon oxide layer positioned on the base substrate. The silicon oxide layer includes a first waveguide, a primary ring resonator optically coupled to the first waveguide, a second waveguide, and a secondary ring resonator optically coupled to the primary ring resonator and the second waveguide. The dual ring resonator further includes at least one heater disposed partially on the primary ring resonator, and a trench within at least the silicon oxide layer and surrounding at least a portion of the first waveguide and the second waveguide.

These and additional features provided by the embodiments of the present disclosure will be more fully understood in view of the following detailed description, in conjunction with the drawings.

BRIEF DESCRIPTION OF THE DRAWINGS

The embodiments set forth in the drawings are illustrative and exemplary in nature and not intended to limit the disclosure. The following detailed description of the illustrative embodiments can be understood when read in conjunction with the following drawings, where like structure is indicated with like reference numerals and in which:

FIGS. 5A and 5B depict an etch design and a thermal analysis graph, respectively, according to one or more embodiments shown and described herein;

DETAILED DESCRIPTION

The present disclosure provides for reduction of transmission loss and thermal isolation between rings and associated improved optical performance in a silicon photonics circuit. Two silicon ring waveguides, each embedded in silicon oxide and decorated with a semi-circular arc-shaped overclad heater, are spaced apart. The optimization of the topology of a surrounding custom air trench increases the steady-state temperature of a specified heated ring relative to the thermal performance of the baseline structure. From an optical perspective, the custom air trench reduces the throughput across the double-ring structure. These and additional embodiments and benefits will be described in greater detail below.

Figure 1:
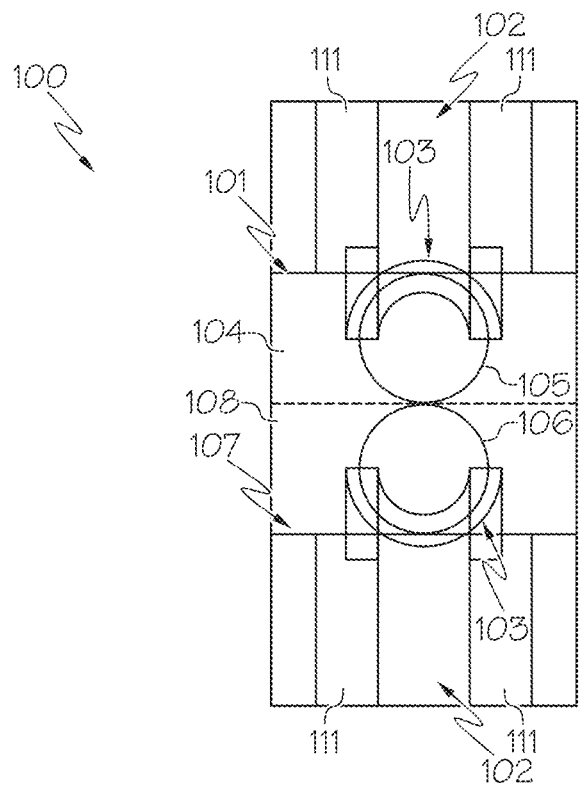
FIG. 1 depicts a top view of a design for a dual ring resonator system, according to one or more embodiments shown and described herein.

FIG. 1 depicts an example dual ring resonator 100 having thermal isolation, optical performance, and transmission loss reduction, according to one or more embodiments shown and described herein. Dual ring resonators described herein may be an optical component in a larger photonic integrated circuit (PIC) that includes other functions, such as optical processing, optical neural networks, lidar, and lidar signal processing, for example. The FIG. 1 is a top-down view of the dual ring resonator 100. As shown by FIG. 1, the example dual ring resonator 100 includes a first waveguide 101, a second waveguide 107, a heater 103, heated region 104, non-heated region 108, an electronic interconnect 111, a silicon oxide layer 102, primary ring resonator 105, and secondary ring resonator 106. Those of skill in the art will appreciate that the dual ring resonator 100 may include different and/or additional components without departing from the scope of the claims. The dual ring resonator 100 may be a smaller component of a photonics integrated circuit, for example. Both first waveguide 101 and second waveguide 107 may carry an optical signal. For example, either first waveguide 101 can act as an input and second waveguide 107 as an output, or second waveguide 107 can act as an input and first waveguide 101 as an output. In another example, both first waveguide 101 and second waveguide 107 can take light in, and interact within the primary ring resonator 105 and secondary ring resonator 106.

The primary ring resonator 105 has an optical path and is optically coupled to the first waveguide 101. The secondary ring resonator 106 also has an optical path and is optically coupled to the second waveguide 107. An optical signal propagates within the first waveguide 101 and, depending on the heat provided by the heater 103, a portion of the optical signal propagates into the primary ring resonator 105, the secondary ring resonator, and then into the second waveguide 107. Thus, there is a throughput between the primary ring resonator 105 and the secondary ring resonator 106 described by their coupling coefficient.

In some embodiments, the dual ring resonator 100 may operate as a beam splitter. In such a case, light traveling through a first waveguide 101 may couple into primary ring resonator 105, as dictated by their coupling coefficient. At the same time, light traveling through a second waveguide 107 may couple to secondary ring resonator 106, as dictated by its coupling coefficient. The coupling coefficients are a factor of many parameters such as spacing, refractive index, and/or the like. The light circulating in primary ring resonator 105 may interfere, couple, or otherwise interact with the light circulating in secondary ring resonator 106. This interaction is dictated by the ring-ring coupling coefficient. The resultant light will couple back through first waveguide 101 and second waveguide 107 in order to be utilized for further processing or to reach an exit port or detector.

The rings can be in any array depending on the box like structure desired out of the spectrum (e.g., 1×4 or 3×4 block structure). As a non-limiting example, the primary ring resonator 105 and the secondary ring resonator 106 may have a diameter of about 20 micron (μm) diameter silicon (Si) and have a ring-to-ring spacing of 200 nm to 500 nm. This spacing, the waveguide width, and the refractive index dictate the coupling coefficient.

In some embodiments, the first waveguide 101 may be looped back on itself, such that a resonance occurs when the optical path length of the resonator is exactly a whole number of wavelengths. The dual ring resonator 100 therefore may support multiple resonances. A coupling mechanism may be used to access the loop. When the waves in the loop build up a round trip phase shift that equals an integer times $2\pi$, the waves interfere constructively and the cavity is in resonance.

The primary ring resonator 105 and the secondary ring resonator 106 are each partially covered with a semi-circular arc-shaped overclad heater 103. Electrically conductive interconnects provide electrical current to the heaters 103. Accordingly, the dual ring resonator 100 may be heated by heater 103. For example, in FIG. 1, the primary ring resonator 105 is heated by the heater 103. As a non-limiting example, the heaters 103 may be a TiW heater layer having a thickness of 200 nm; each heater 103 may have a width of 5 μm, and cover a 180±30 degree arc over a corresponding ring resonator on the side closest to a first waveguide 101 or second waveguide 107. The heater 103 may include conductors, overclad heaters, or other components for tuning an absorption or transmissivity property of one or more waveguides of the dual ring resonator 100.

Figure 2:
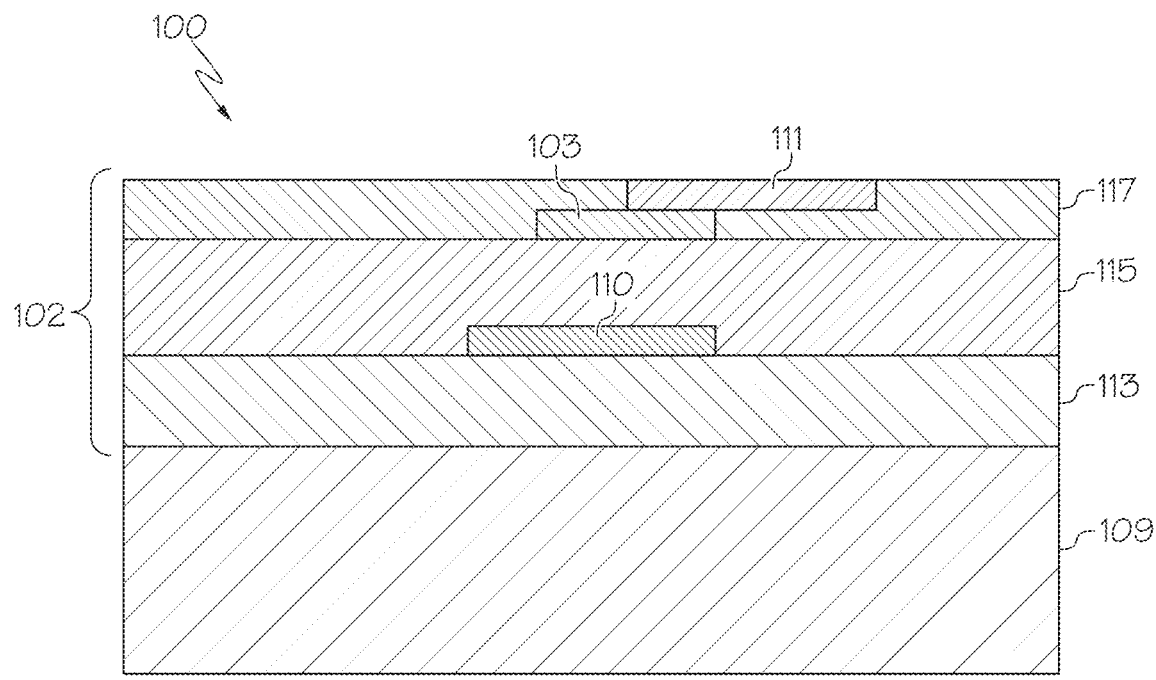
FIG. 2 depicts a cross section of a silicon photonics circuit of a dual ring resonator system, according to one or more embodiments shown and described herein.

FIG. 2 depicts a partial cross-sectional view of the example dual ring resonator 100 according to one or more embodiments shown and described herein. The wafer includes silicon base substrate 109 (e.g., 675 μm thick), a silicon dioxide spacer layer 113 (e.g., 2 μm thick), a silicon oxide amorphous layer 115 (e.g., 2.2 μm thick), and a silicon oxide passivation layer 117 (e.g., 300 nm thick). The index of refraction within the silicon oxide amorphous layer 115 includes the embedding of a silicon waveguide layer 110 to form one of the ring resonators (e.g., primary ring resonator 105 or secondary ring resonator 106) or even one of the waveguides therein. A TiW alloy heater 103 (e.g., 200 nm thick), and a TiW Al routing bilayer forming an electronic interconnect 111 (e.g., 700 nm thick) are provided within the passivation layer 117. Those of skill in the art will appreciate that the silicon wafer 200 may take other forms as well. It should be understood that the example thicknesses provided are for illustrative purposes only, and that other thicknesses may be utilized.

Further primary ring resonator 105 and secondary ring resonator 106 are defined by silicon provided within microtrenches etched in silicon oxide layers of the device. An etch volume and depth may be surrounding and/or within primary ring resonator 105 and secondary ring resonator 106. For example, in FIGS. 5-7, an etch pattern 220, 320, or 420, surround and/or within primary ring resonator 105 and secondary ring resonator 106. Etch patterns 220, 320, and 420 can be trenched structures etched down into the body of the dual ring resonator 100 and conform to the shape of the primary ring resonator 105 and secondary ring resonator 106 and provide thermal isolation. (e.g., the trenched structures are disposed circles defined by the primary ring resonator 105 and the secondary ring resonator 106). The optimization of the topology of a surrounding depth of a custom air trench results in an increase in the steady-state temperature of a specified heated ring (e.g., primary ring resonator 105) relative to the thermal performance of the baseline structure.

As stated above, the dual ring resonator 100 is tuned by thermo-optic tuning wherein heat provided by the heater changes the proportion of optical signal propagating within the primary ring resonator 105 and secondary ring resonator 106. However, to achieve precise control of the dual ring resonator, thermal isolation can be achieved by etching to a region further than the silicon layer 110. As described in more detail below, embodiments of the present disclosure provide for thermal isolation between the primary ring resonator 105 and the secondary ring resonator 106 by use of trenches that are etched between the primary ring resonator 105 and secondary ring resonator 106.

Two-dimensional (2D) models are based on established composite slab theory with the silicon dioxide cladding plus metal interconnects collapsed to a single layer with the effective thermal conductivity derived from the spatially dependent layer-wise geometry and thickness of the structure. Heat conduction is modeled based on the governing equation.

$$\rho C \frac{\partial T}{\partial t} = \nabla \cdot k \nabla T + Q \quad (1)$$

Here, Q is the volumetric heat source, T is the temperature state variable, C is the specific heat, ρ is the density, and k is the material thermal conductivity. For an anisotropic composite in 2-D, the spatially varying in-plane effective thermal conductivity, $k=k_e$, is derived following composite slab theory, with standard material properties for the silicon base substrate, silicon oxide, and metal interconnect plus heater layers as inputs. Additionally, for steady-state response, the left-hand-side term in Eq. (1) is set to zero.

Power is applied as a heat source, to the heater 103 for designated silicon microring, primary ring resonator 105. Out-of-plane convection is modeled as a convective thermal resistance. The relatively thick silicon base substrate 109 is modeled as an into-the-plane conductive thermal resistance, with a fixed temperature, at the bottom of the layer.

Figure 3:
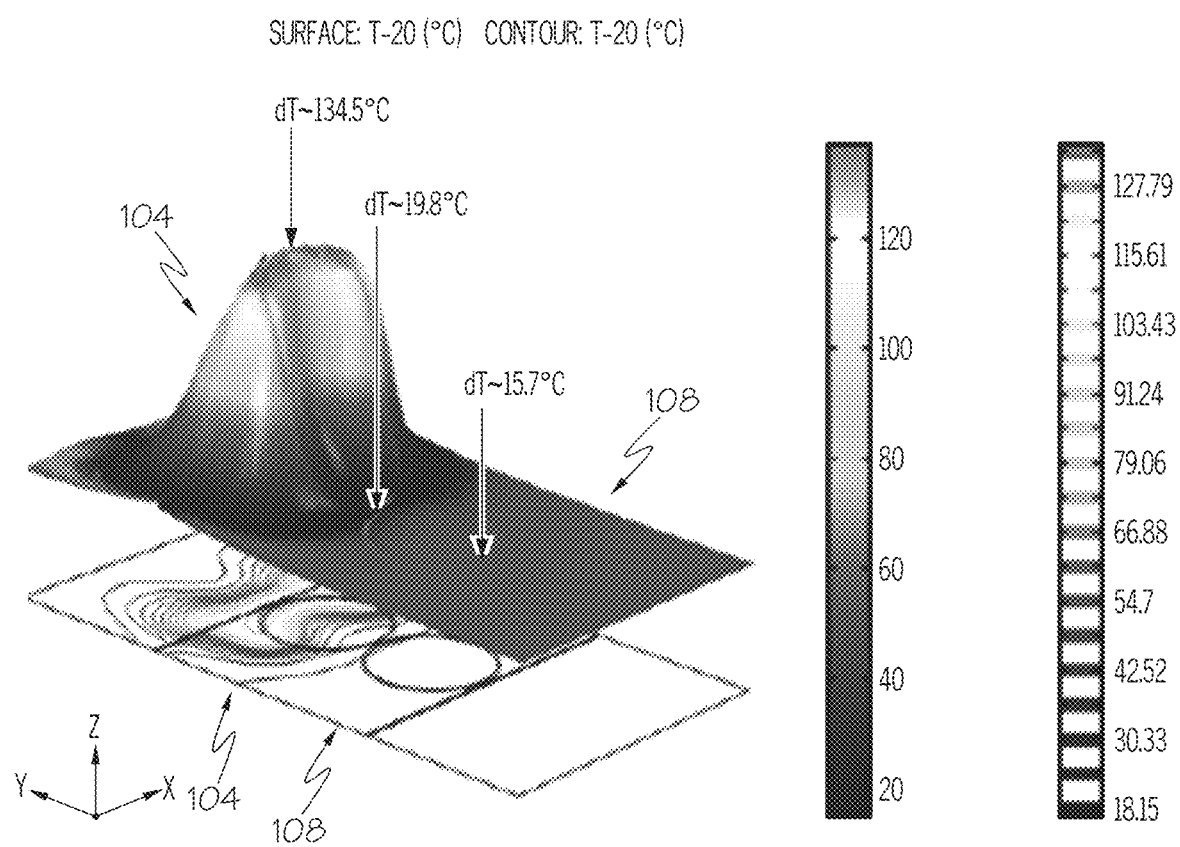
FIG. 3 depicts a thermal analysis graph, according to one or more embodiments shown and described herein.

FIG. 3 depicts a thermal analysis on a dual ring resonator having silicon rings with a 10 μm diameter according to the above-described model. A trench surrounding the two ring resonators is not provided in the dual ring resonator of FIG. 3, which is used for comparative purposes. The comparative example of FIG. 3 has a heater that applies 40 mW and a silicon base substrate that is 275 μm thick. It is noted that the power and thickness affect the temperature results.

FIG. 3 depicts a 3D analysis illustrating the change in temperature (dT) at various regions as compared to an unheated region of the surface of the dual ring resonator. The unheated surface temperature was 20 degrees C. The change in temperature for the heated portion of the primary ring resonator is 134.5 degrees C. where a change in temperature at the first waveguide 101 is only 19.8 degrees C. The change in temperature is 15.7 degrees C. at the unheated secondary ring resonator, effectively tuning the primary ring resonator.

Figure 4:
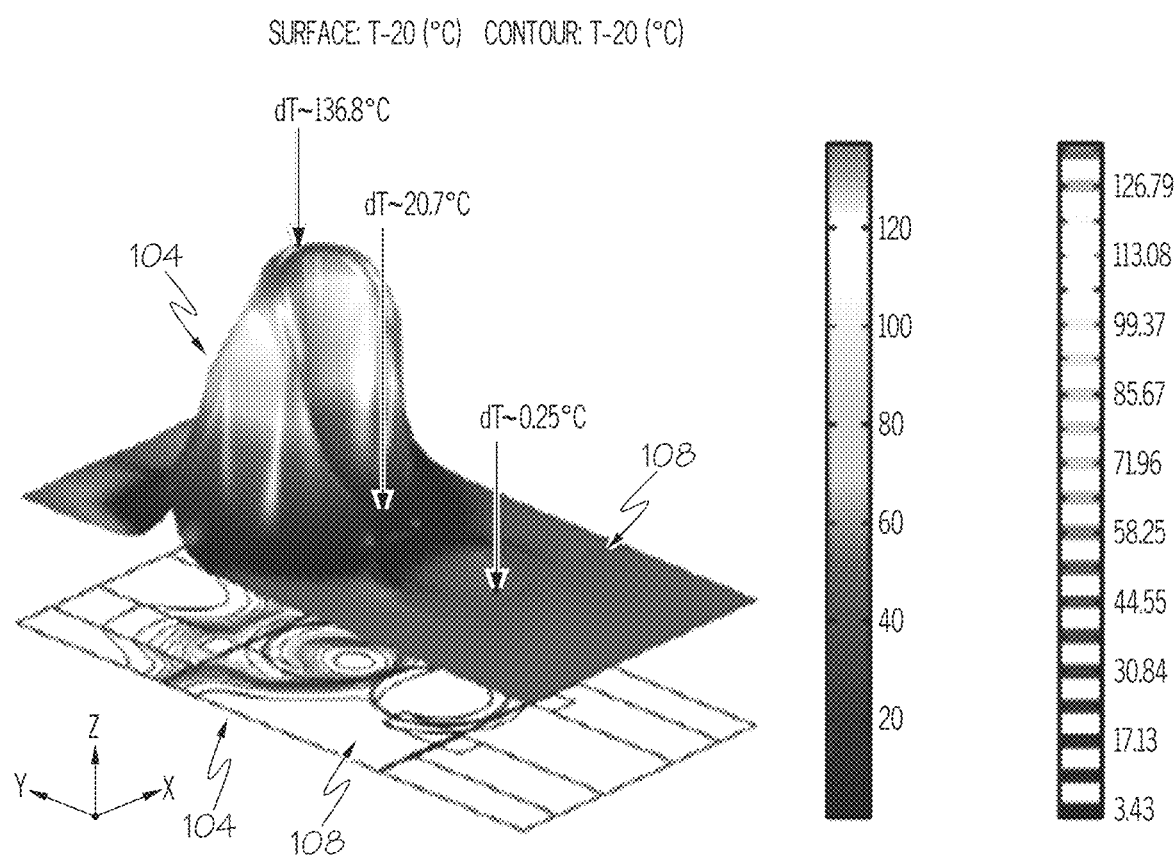
FIG. 4 depicts a thermal analysis graph, according to one or more embodiments shown and described herein.

FIG. 4 depicts a 2D analysis of the dual ring resonator of FIG. 4 where the heater emitted 80 mW. The change in temperature for the heated portion of the primary ring resonator is 136.8 degrees C. where a change in temperature at the first waveguide 101 is only 20.7 degrees C. The change in temperature is 0.25 degrees C. at the unheated secondary ring resonator, effectively tuning the primary ring.

Although the examples of FIGS. 3 and 4 show that the heater can be used to tune the primary ring resonator, there is a significant drop in temperature between the heated portion of the primary ring resonator and the unheated portion of the primary ring resonator. Further, there is thermal cross-talk between the primary ring resonator and the secondary ring resonator. In an ideal case, the temperature surrounding the primary ring resonator will be substantially equal, and the 3D analysis will look like a volcano cone without the steep drop-off as shown in FIGS. 3 and 4. Further, in an ideal dual ring resonator, no heat will transfer from the heated region 104 to the non-heated region 108.

As stated above, embodiments of the present disclosure include one or more trenches surrounding one or more of the primary ring resonator 105 and the secondary ring resonator 106 to provide a thermal barrier such that the primary ring resonator 105 is more uniformly heated and heat transfer to the secondary ring resonator 106 is further inhibited. Thus, a deep reactive ion etch (DRIE) process may be used to etch through the layers of the silicon oxide layer 102 (see FIG. 2) and potentially into the silicon base substrate 109 is used to realize a trench structure around the dual ring resonator 100.

FIGS. 5A-7B depict similar 2D thermal analysis results on silicon dual ring resonators having a 10 μm diameter but with various etched trench patterns according to embodiments of the present disclosure. Utilizing composite theory for the effective thermal conductivity of various components, for a given composite system and trench etch geometry, the effective thermal conductivity not only depends on the volume fraction of the trench void region but also on the overall trench etch size.

FIG. 5A illustrates a top-down view of a dual ring resonator 200 similar to that depicted in FIG. 1 but including an etch pattern 220 etched surrounding the primary ring resonator 105 and the secondary ring resonator 106 and within both the heated region 104 and the non-heated region 108. The black regions in FIG. 5A represent a void of silicon dioxide material and thus the trench. A design constraint of etching no more than 25% of the heated region 104 and non-heated region 108 was applied. The heater 103 produced 80 mW of power. FIG. 5B depicts a 2D thermal analysis results obtained in a manner similar to FIGS. 3 and 4. The change in temperature for the heated portion of the primary ring resonator is about 143.8 degrees C. where a change in temperature at the contact between the primary ring resonator 105 and the secondary ring resonator 106 (i.e., a non-heated portion of the primary ring resonator 105) is about 100.2 degrees C. The change in temperature is about 0 degrees C. at the unheated secondary ring resonator. Both the heated primary ring resonator 105 and unheated secondary ring resonator 106 are isolated but less heat is transmitted to the unheated secondary ring resonator 106. Note that the temperature gradient across the first ring is reduced due to the trench. A comparison of FIG. 5B and FIG. 4 shows a significant improvement in equally heating the primary ring resonator and limiting heat transfer to the non-heated region 108.

Figure 6A:
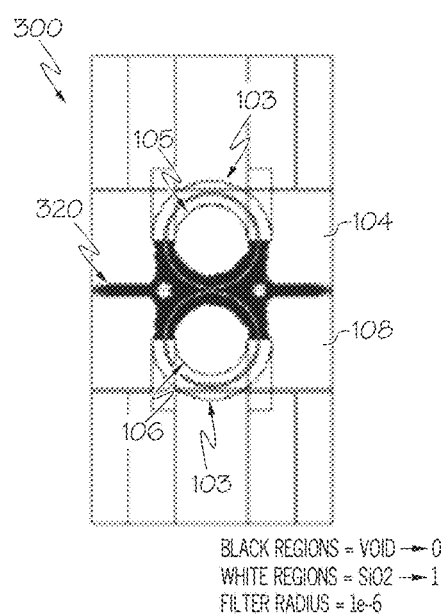
FIGS. 6A and 6B depict an etch design and a thermal analysis graph, respectively, according to one or more embodiments shown and described herein.
Figure 6B:
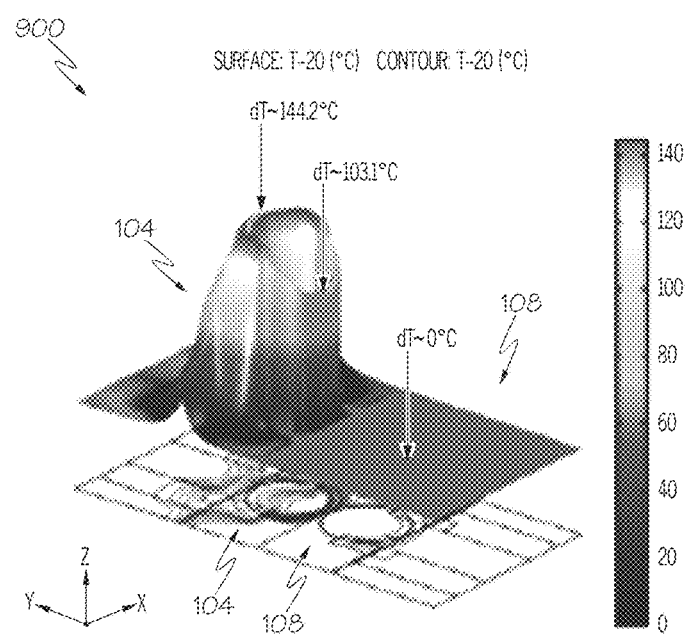

FIG. 6A illustrates a top-down view of another example dual ring resonator 300 similar to that of FIG. 5A except the etch pattern 320 is generated using a design constraint of no more than 50% of the heated region 104 and the non-heated region 108 volume being etched. Here more of the ring is hollow creating a slightly larger etch. The heater 103 produced 80 mW of power. FIG. 6B depicts a 2D thermal analysis result. The change in temperature for the heated portion of the primary ring resonator is about 144.2 degrees C. where a change in temperature at contact between the primary ring resonator 105 and the secondary ring resonator 106 (i.e., a non-heated portion of the primary ring resonator 105) is about 103.1 degrees C. The change in temperature is about 0 degrees C. at the unheated secondary ring resonator 106. So, a larger change in temperature results from the heated primary ring resonator 105 than the unheated secondary ring resonator 106 for the same amount of heat applied when compared with a non-etched design. Both the heated primary ring resonator 105 and unheated secondary ring resonator 106 are isolated but less heat is transmitted to the unheated secondary ring resonator 106. The change in temperature from across the ring is reduced. Thus, the etch pattern 320 of FIG. 6A formed using a 50% maximum etched volume constraint also appears to improve thermal performance.

Figure 7A:
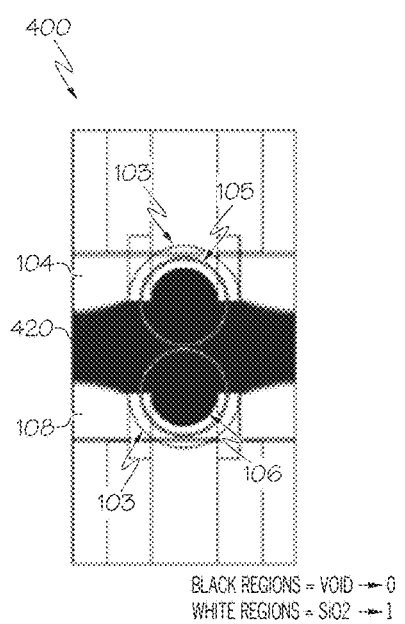
FIGS. 7A and 7B depict an etch design and a thermal analysis graph, respectively, according to one or more embodiments shown and described herein.
Figure 7B:
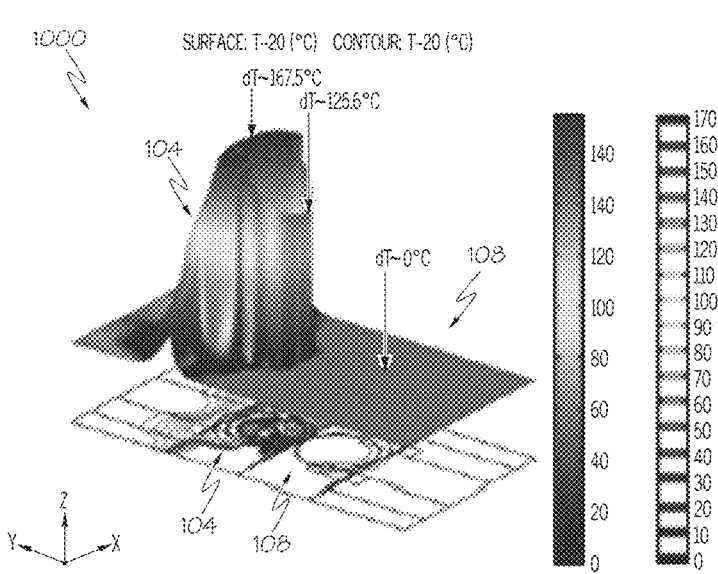

FIG. 7A illustrates a top-down view of another example dual ring resonator 400 similar to that of FIG. 5A except the etch pattern 420 is fabricated using a design constraint of no more than 75% of the heated region 104 and the non-heated region 108 volume being etched. The optimization routine generates a big block etch. The heater 103 produced 80 mW of power. FIG. 6B depicts a 2D thermal analysis result. The change in temperature for the heated portion of the primary ring resonator is about 167.5 degrees C. where a change in temperature at the contact between the primary ring resonator 105 and the secondary ring resonator 106 (i.e., a non-heated portion of the primary ring resonator 105) is about 125.1 degrees C. The change in temperature is about 0 degrees C. at the unheated secondary ring resonator 106. So, a larger change in temperature results from the heated primary ring resonator 105 than the unheated secondary ring resonator 106 for the same amount of heat applied. Both the heated primary ring resonator 105 and unheated secondary ring resonator 106 are isolated but less heat is transmitted to the unheated secondary ring resonator 106. Thus, the etch pattern 420 of FIG. 7A formed using a 75% etched volume constraint also appears to improve some aspects of thermal performance.

In embodiments, the trench is such that a difference between a maximum temperature and a minimum temperature of the primary ring resonator 105 is approximately 40 degrees C. although this temperature gradient may be dependent on thermal loads and device boundary conditions.

The trench etch design may be established using an optimization model. The model may use a similar principles as other heat flow control composite design problems as a way to evaluate the effectiveness of the trench designs. Optimization to minimize the temperature gradient for the heated primary ring resonator 105 is used as an objective function. The design domain is the entire area between the rings mirrored about the device centerline between the rings and does not include a waveguide.

A topology optimization approach considering steady-state conduction heat transfer physics is adopted for computationally efficient design of the dual ring resonator trench etch structure. A gradient-based approach similar to that used for the design of thermo-optic switches is adopted considering only steady-state thermal response yet still directed toward a specific PIC device, which is a dual ring resonator with unique objectives.

The design domain is symmetric and may be reflected about the horizontal centerline of the 2D model because there are the same bi-directional thermal response characteristics regardless of which heater 103 is activated. The presence of silicon dioxide versus an empty pocket (or void) anywhere in this region is designed to arrive at a DRIE etch pattern or mask. Thus, the gradient-based optimization approach employs a solid isotropic material with penalization (SIMP) interpolation scheme, where the material thermal conductivity is specified as a function of a design variable, $\gamma$, as $k(\gamma) = k_{min} + (k_{max} - k_{min}) \gamma^p$. The minimum and maximum thermal conductivity values, $k_{min}$ and $k_{max}$, respectively, are set to represent a void or solid silicon dioxide material. A multi-term objective function is used in the optimization, $$f = w_1 \int_{\Omega_{R1}} T \Omega_{R1} + w_2 \int_{\Omega_{R2}} (\nabla T)^2 \Omega_{R2} \quad (2)$$

where the first term on the right-hand-side (RHS) is proportional to the average temperature of R2 or secondary ring resonator 106, while the second term on the RHS is proportional to the temperature gradient in R1 or primary ring resonator 105. In Eq. (2), $w_1$ and $w_2$ are weighting values to adjust the priority of the two terms in the objective function. Commercial finite element analysis software may be used for numerical implementation, with a built-in method of moving asymptotes gradient-based optimizer. Design studies may be performed both without and with a partial differential equation (PDE)-based design variable filter to enforce an etch pattern minimum length scale related to eventual device manufacturability with no volume constraint.

Figure 8A:
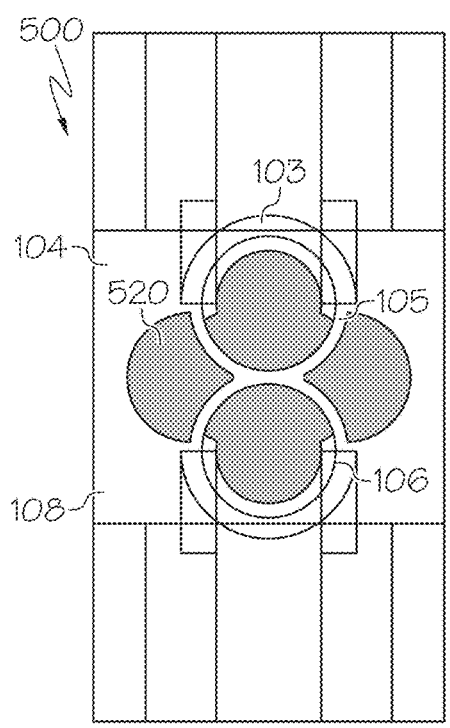
FIGS. 8A-8E depict etch pattern and various etch designs based on etch depth, according to one or more embodiments shown and described herein.
Figure 8B:
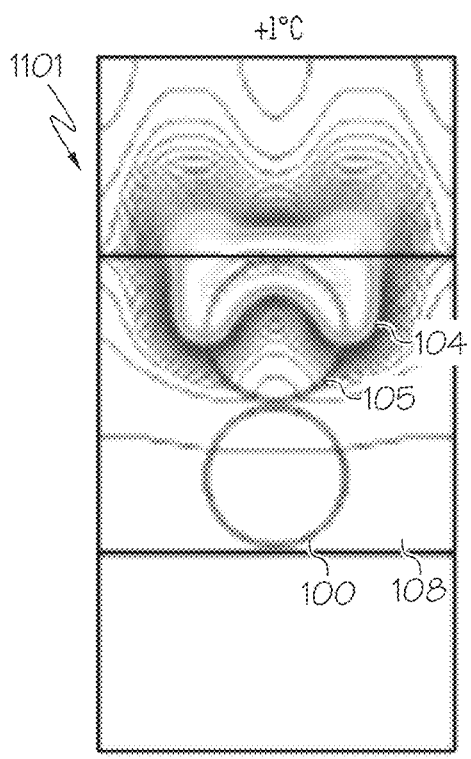
Figure 8C:
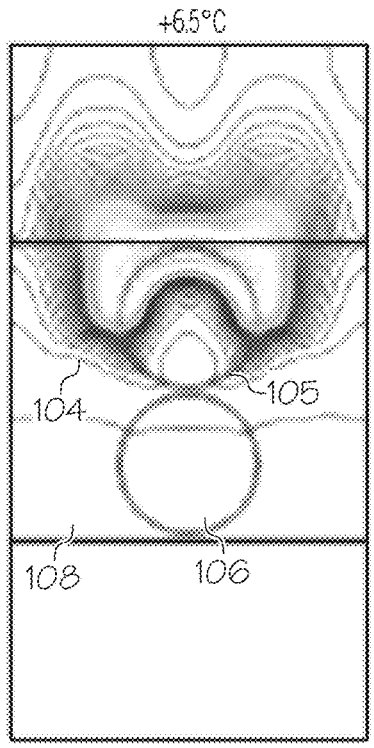

FIG. 8A illustrates an example trench etch pattern having four lobes for evaluating the depth of the trench. FIGS. 8B-8E illustrate 3D thermal analysis results for different etch depths. The deeper the etch depth, the farther down there will be no thermal conduction from the same level as the silicon ring. From FIGS. 8B-8E, it is observed that the benefit of a deeper etch depth tapers off around 4 µm, where the temperature of the heated ring is increased by 15.4 degree C. relative to a double ring device without any etched trench.

Figure 8D:
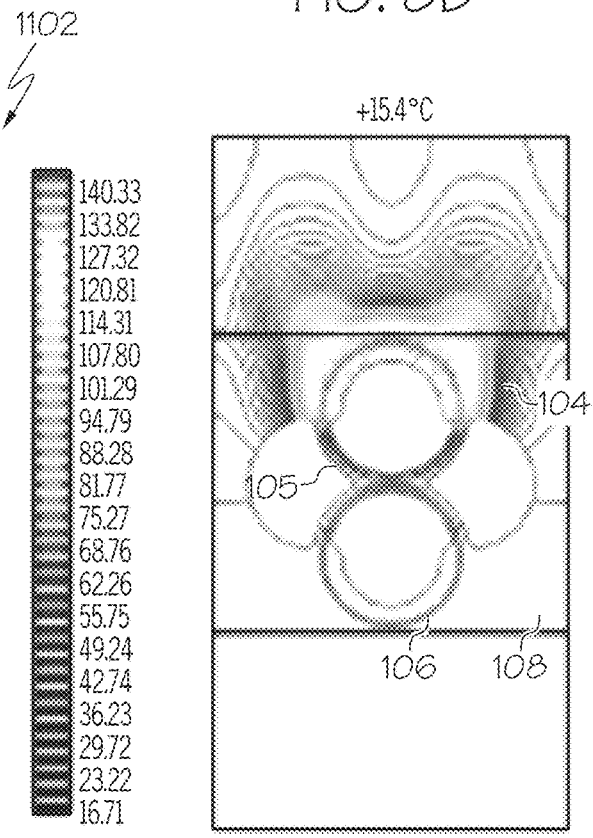
Figure 8E:
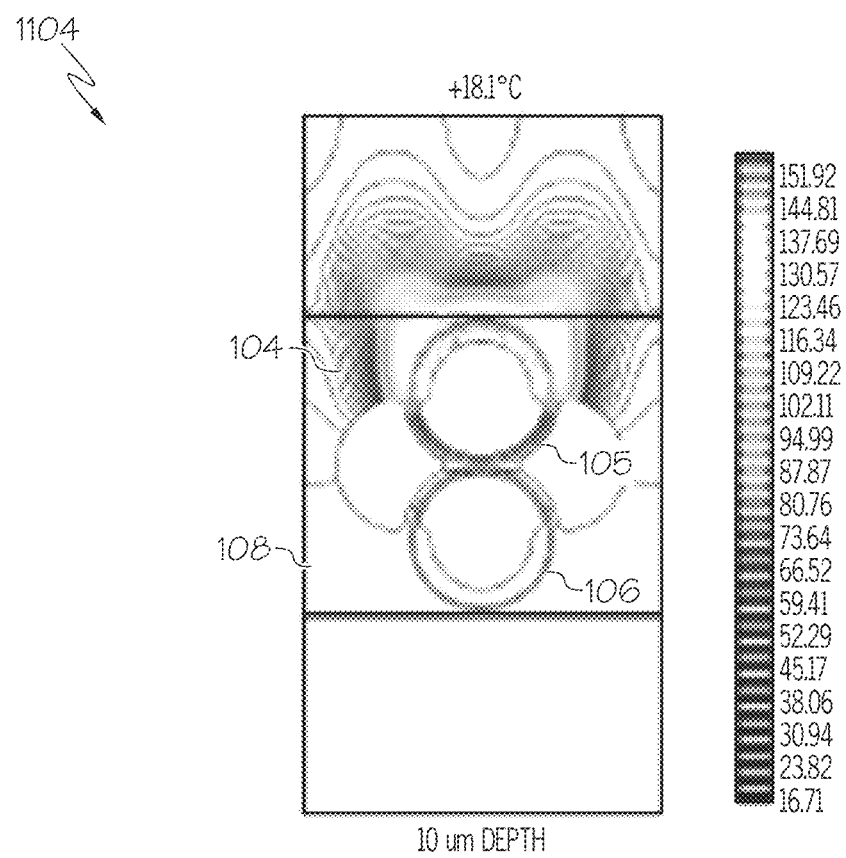

At 10 µm etching begins into the lowermost silicon layer which is more challenging. At 1 or 2 µm depth, the thermal effect of the etch may not be as significant. The increase in the change in temperature is based on the etch depth. With a shallow etch depth, the heated ring change in temperature is only about a degree. At 4 µm, which is through most of the oxide, change in temperature when heated is more significant (+15) and moving from 4 to 10 µm, the effect plateaus and deep etching into the silicon layer is not necessary. As shown in FIG. 2 the total oxide thickness is about 4.5 µm. As shown in FIG. 8D, the optimization of the topology of a surrounding 4 µm depth custom air trench results in a 15.4 degrees C. increase in the steady-state temperature of a specified heated ring relative to the thermal performance of the baseline structure. From an optical perspective, the custom air trench reduces the throughput by a certain percentage across the double-ring structure and produces a larger difference between ring resonances when comparing performance in heater on and off states.

Figure 9:
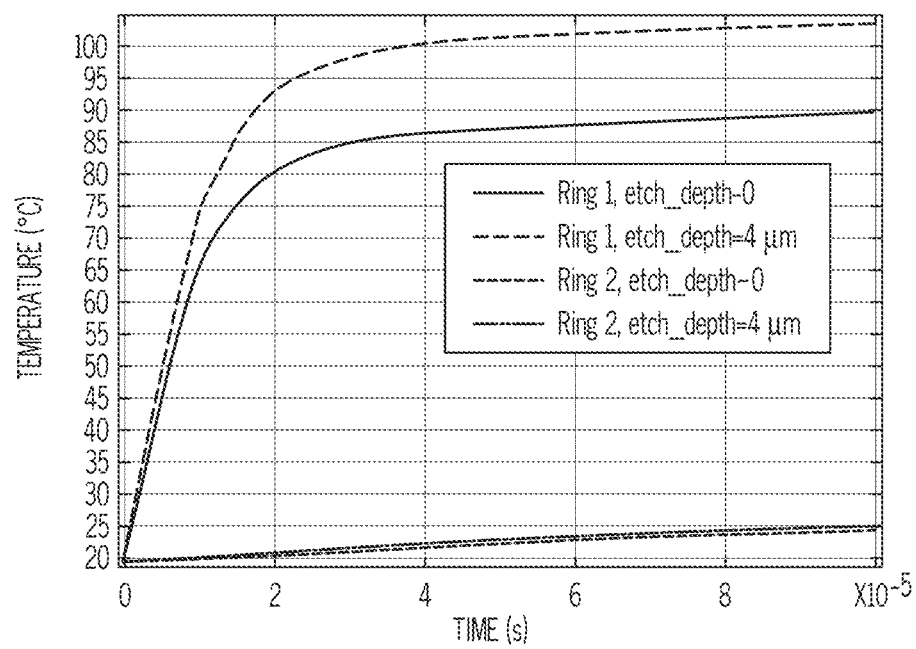
FIG. 9 depicts a graph of temperature over time for various etch designs, according to one or more embodiments shown and described herein.

FIG. 9 shows the effect of thermal isolation on the time transient thermal response assuming a 4 µm depth etched trench. FIG. 9 shows that heated Ring 1 utilizing the etched trench exhibits a 15 degree C. higher temperature rise over time relative to the non-heated Ring 2 when compared to the design without the custom trench pattern. This result may also be interpreted to mean that the etched device design is thermally faster at achieving a desired temperature rise. Or, alternatively, for the same steady-state temperature rise, a reduced amount of power might instead be applied to the overclad heater.

Figure 10A:
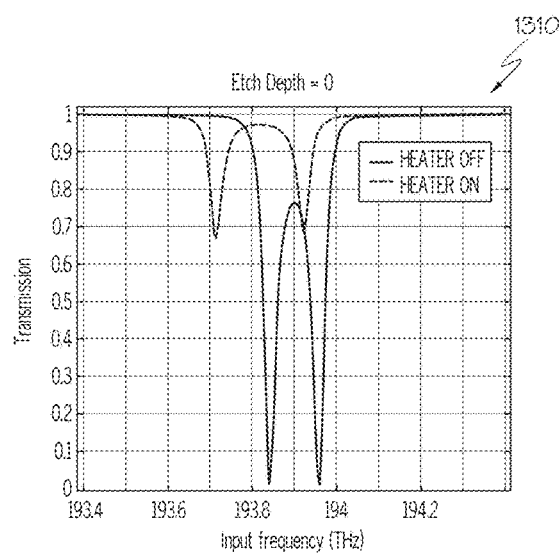
FIGS. 10A and 10B depict graphs of temperature without and with etch, respectively, according to one or more embodiments shown and described herein.
Figure 10B:
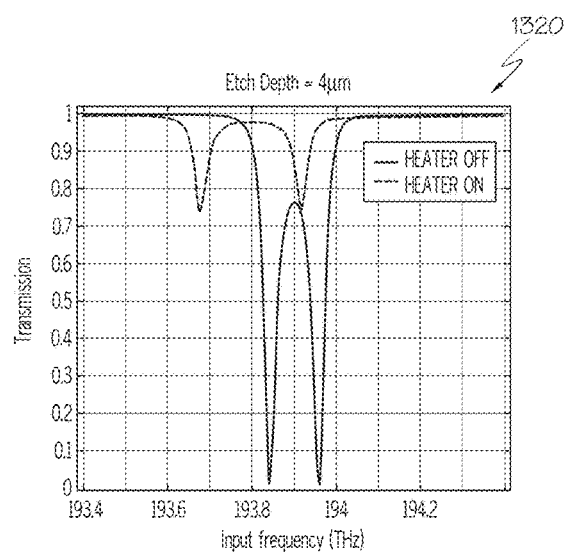

FIG. 10 depicts a comparison with and without etch according to one or more embodiments shown and described herein. The effect of the optimized etched trench pattern on the throughput across the double-ring device varies as the spacing between troughs in FIG. 10A and FIG. 10B increases when the heater is on. The solid curve in these figures is with heater off and the dashed curve is with heater on. The troughs are also not as deep with the etch which means less thermal loss.

An x-axis represents a given optical frequency at a ring resonator (e.g., primary ring resonator 105), and the y-axis represent an amount of transmission or absorption (by the ring resonator) of the optical signal of that frequency. FIG. 10A represents respective amounts of transmission at given wavelengths by ring resonator with and without a heater on a dual ring resonator system with no etch pattern. FIG. 10B represents respective amounts of transmission at given wavelengths by a ring resonator with and without a heater on a dual ring resonator system with an etch pattern. As shown, each frequency response may have a baseline amount of transmission. Each frequency response may also include a number of dips, indicating higher amounts of transmission at those wavelengths.

Figure 11:
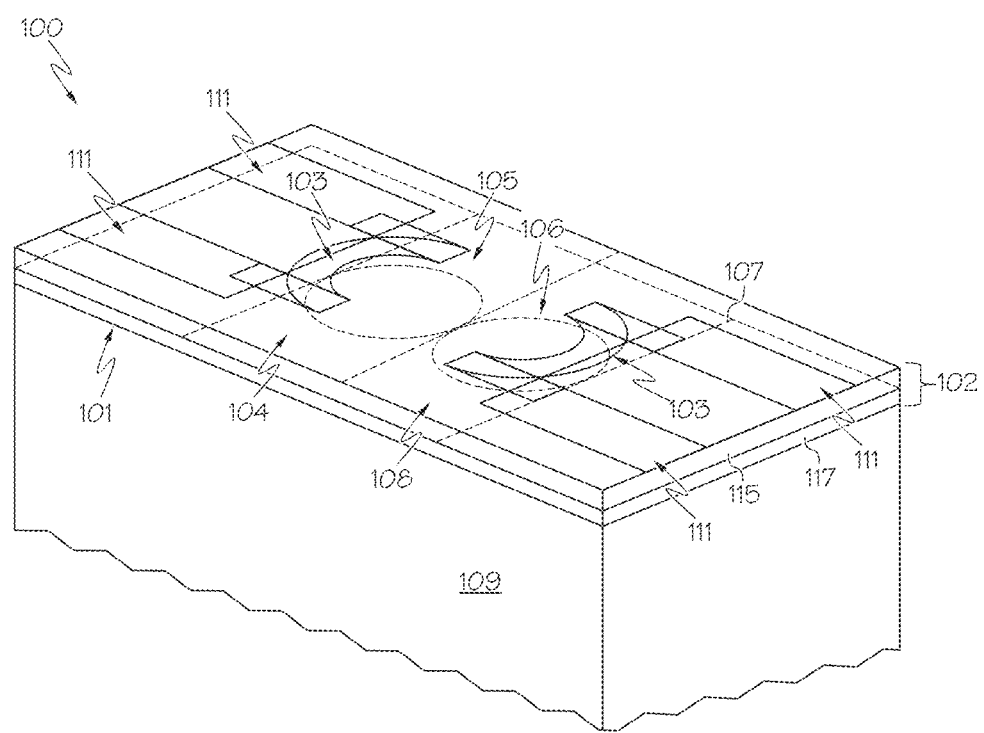
FIG. 11 depicts a perspective view of an exemplary silicon photonics circuit, according to one or more embodiments shown and described herein.

In embodiments, dual ring resonator 100 may be an optical component in a larger photonic integrated circuit (PIC). FIG. 11 is a perspective view of the dual ring resonator 100. As shown by FIG. 11, the example dual ring resonator 100 includes an first waveguide 101, a second waveguide 107, a heater 103, heated region 104, non-heated region 108, an electronic interconnect 111, a silicon oxide layer 102, primary ring resonator 105, and secondary ring resonator 106 provided on silicon base substrate 109.

The primary ring resonator 105 receives heat from the heater 103 at the first waveguide 101, and the filter selectively transmits the received heat to the primary ring resonator 105 and isolates heat from the secondary ring resonator 106.

The primary ring resonator 105 and secondary ring resonator 106 of FIG. 1 can be thermally tuned by heater 103 of FIG. 1 to enhance the performance of the photonic structure. Primary ring resonator 105 and secondary ring resonator 106 may act as filters able to thermally tune the performance of the rings separately. This allows the rings to be tuned more effectively to get the right structure in various telecommunications applications.

In some embodiments the etch pattern simultaneously reduces the throughput across the primary ring resonator 105 and secondary ring resonator 106 and increases the thermal isolation between the rings. The dimensions of coupling gaps between ring resonators and with the waveguides allow for the required results such as on crosstalk or insertion loss.

The external thermal load can be a laser or overclad heater such as heater 103. The heating element can increase in varying temperatures. For example a temperature of +15.4° C. relative to a double ring device can produce optimal results.

The etch patterns 220, 320, and/or 420 may provide a feasible way to thermally tune primary ring resonator 105 and secondary ring resonator 106. The design may have different bounds. For example, an upper bound on the etch volume may be 25% for optimal tuning. The design may also have different etch depths. For example a volume of 4 μm may provide optimal tuning.

In embodiments the etch pattern is aligned with a first ring waveguide structures and the heating element is between the first ring waveguide structure and a second ring waveguide structure. In other embodiments there can be more ring resonators having an optical path. For example, a third ring resonator can be coupled to one of the ring waveguide structures.

Though the dual ring resonator 100 is shown as including only primary ring resonator 105 and secondary ring resonator 106, the dual ring resonator 100 could contain additional and/or fewer resonators. For example, optical device system could include a third ring resonator.

Precise control of the electromagnetic response of, and interaction between, ring resonators is beneficial to performance. In exploiting the thermo-optic effect, the etched substrate designs improve thermal tuning response. Some examples relate to reducing thermo-optic switch power consumption using a trench etch, backside etching or undercutting of silicon modulators with overclad metal heaters for improved thermal tuning, or combinations of trenching and undercutting for large-scale PICs. Methods can also be applied to trench/undercut design for faster transient response of thermo-optic switches.

The dual ring resonator 100 is also useful when there is a coupling. In an example, a coupling mechanism is using codirectional evanescent coupling between the ring and an adjacent bus waveguide. The transmission of the bus waveguide with a ring resonator will show dips around the ring resonances. This way, the ring resonator behaves as a filter, which can be used for applications in optical communication, especially wavelength division multiplexing (WDM). Alternatively, these rings can be used for sensing.

It will be understood by those of skill in the art that various alternatives of the above-described aspects and embodiments may be used without departing from the scope of the claims. For example, heater 103 may take the form of a single heater or a plurality of heaters.

It should now be understood that embodiments described herein provide dual ring resonator system for thermal isolation and reduced transmission loss and methods thereof.

It is noted that the terms "substantially" and "about" may be utilized herein to represent the inherent degree of uncertainty that may be attributed to any quantitative comparison, value, measurement, or other representation. These terms are also utilized herein to represent the degree by which a quantitative representation may vary from a stated reference without resulting in a change in the basic function of the subject matter at issue.

While particular embodiments have been illustrated and described herein, it should be understood that various other changes and modifications may be made without departing from the spirit and scope of the claimed subject matter. Moreover, although various aspects of the claimed subject matter have been described herein, such aspects need not be utilized in combination. It is therefore intended that the appended claims cover all such changes and modifications that are within the scope of the claimed subject matter.

What is claimed is:

1. A dual ring resonator comprising:
   a base substrate;
   a silicon oxide layer positioned on the base substrate;
   a first waveguide within the silicon oxide layer;
   a primary ring resonator within the silicon oxide layer and optically coupled to the first waveguide;
   a second waveguide within the silicon oxide layer;
   a secondary ring resonator within the silicon oxide layer and optically coupled to the primary ring resonator and the second waveguide;
   at least one heater disposed partially on the primary ring resonator; and
   a trench within at least the silicon oxide layer and surrounding at least a portion of the first waveguide and the second waveguide, wherein the trench surrounds a non-heated portion of the primary ring resonator.

2. The dual ring resonator of claim 1, further comprising:
   a coupling coefficient that describes an amount of light coupled from the first waveguide to the primary ring resonator;
   a coupling coefficient that describes the amount of light coupled from the second waveguide to the secondary ring resonator; and
   a coupling coefficient that describes the amount of light coupled from the primary ring resonator to the secondary ring resonator.

3. The dual ring resonator of claim 1, wherein the primary ring resonator is heated and the secondary ring resonator is not heated.

4. The dual ring resonator of claim 3, wherein the trench is less than 75% of the volume of the total of the heated region and the non-heated region within the silicon oxide layer.

5. The dual ring resonator of claim 1, wherein a depth of the trench is about 4 μm.

6. The dual ring resonator of claim 1, wherein the heater has a semi-circular shape, and wherein the heater comprises a TiW heating element.

7. The dual ring resonator of claim 1, wherein the trench comprises circles defined by the primary ring resonator and the secondary ring resonator.

8. The dual ring resonator of claim 1, wherein the trench is defined by four lobes.

9. The dual ring resonator of claim 1, wherein:
a difference between a maximum temperature and a minimum temperature of the primary ring resonator is no greater than 40 degrees C.

10. The dual ring resonator of claim 1, further comprising a first and second interconnect electrically coupled to the heater.

11. A photonics integrated circuit comprising:
a base substrate;
a dual ring resonator positioned on the base substrate, the dual ring resonator comprising:
a silicon oxide layer positioned on the base substrate;
a first waveguide;
a primary ring resonator within the silicon oxide layer and optically coupled to the first waveguide;
a second waveguide within the silicon oxide layer;
a secondary ring resonator within the silicon oxide layer and optically coupled to the primary ring resonator and the second waveguide;
at least one heater disposed partially on the primary ring resonator; and
a trench within at least the silicon oxide layer and surrounding at least a portion of the first waveguide and the second waveguide, wherein the trench surrounds a non-heated portion of the primary ring resonator.

12. The photonics integrated circuit of claim 10, wherein the primary ring resonator is within a heated region and the secondary ring resonator is within a non-heated region.

13. The photonics integrated circuit of claim 11, wherein the trench is less than 75% of the volume of the total of the heated region and the non-heated region within the silicon oxide layer.

14. The photonics integrated circuit of claim 10, wherein a depth of the trench is about 4 μm.

15. The photonics integrated circuit of claim 10, wherein the heater has a semi-circular shape.

16. The photonics integrated circuit of claim 10, wherein the heater comprises a TiW heating element.

17. The photonics integrated circuit of claim 10, wherein the trench is comprised of circles defined by the primary ring resonator and the secondary ring resonator.

18. The photonics integrated circuit of claim 10, wherein the trench is defined by four lobes.

* * * * *